United States Patent [19]

Cowan

[11] 4,421,655
[45] Dec. 20, 1983

[54] ORGANOPHILIC POLYPHENOLIC ACID ADDITIVES FOR WELL-WORKING COMPOSITIONS

[75] Inventor: Jack C. Cowan, Lafayette, La.

[73] Assignee: Venture Chemicals, Inc., Lafayette, La.

[21] Appl. No.: 272,684

[22] Filed: Jun. 11, 1981

[51] Int. Cl.³ .................................................. C09K 7/06
[52] U.S. Cl. .............................. 252/8.5 M; 252/8.5 P; 252/8.55 R; 260/124 R; 260/401; 260/404.5
[58] Field of Search .......... 252/8.5 M, 8.5 P, 8.55 R; 260/404.5 PA, 401

[56] References Cited

U.S. PATENT DOCUMENTS

| | | | |
|---|---|---|---|
| 3,168,475 | 2/1965 | Jordan et al. | 252/8.5 |
| 3,232,870 | 2/1966 | Cowan et al. | 252/8.5 |
| 3,494,865 | 2/1970 | Andrews et al. | 252/8.5 |
| 3,671,427 | 6/1972 | Andrews et al. | 252/8.5 |
| 3,671,428 | 6/1972 | Kim | 252/8.5 |

FOREIGN PATENT DOCUMENTS 578341  6/1959  Canada ................................. 252/8.5

*Primary Examiner*—Herbert B. Guynn
*Attorney, Agent, or Firm*—Roy F. House

[57] ABSTRACT

The invention provides novel organophilic derivatives of polyphenolic compounds which are readily soluble and/or dispersible in hydrocarbons to prepare oil base well-working compositions having a low filter loss. These fluid loss additives are obtained by reacting together one or more polyphenolic acid compounds with one or more polyamino compounds and a polyvalent metallic cation compound.

The invention also provides a method of preparing organophilic ammonium salts of polyphenolic compounds of enhanced stability and oil solubility, and well-working fluids containing these salts.

14 Claims, No Drawings

ORGANOPHILIC POLYPHENOLIC ACID ADDITIVES FOR WELL-WORKING COMPOSITIONS

The invention relates to organophilic amine derivatives of complex phenolic compounds, to methods for their manufacture, and to their use in oil base well working fluids.

In the drilling of wells for oil and gas by the rotary method, it is common to use a circulating fluid which is pumped down to the bottom of the well through a drill pipe, where the fluid emerges through ports in the drilling bit. The fluid rises to the surface in the annular space between the drill pipe and the walls of the hole, and at the surface it is treated to remove cuttings and the like and to prepare it for recirculation into the drill pipe. The circulation is substantially continuous while the drill pipe is rotated.

The present invention pertains to oil base drilling fluids or oil base muds which includes water-in-oil (invert) emulsions as well as oil base fluids containing only small amounts or no emulsified water.

An important feature of well working fluids of the class described is their ability to resist filtration. In most instances when they are in actual use, whether as drilling fluids, packer fluids, fracturing or completion fluids, the well working fluid is in contact with a more or less permeable formation, such as, for example, sandstone, sandy shale and the like, with an effective balance of pressure such that the fluid tends to be forced into the permeable formation. When a well working fluid is deficient in its ability to resist filtration, then the solids in the fluid are held back by the permeable formation and build up as a filter cake or sludge on its surfaces, while the liquid per se of the well working fluid filters into the permeable formation. The filter cake or sludge thus formed is generally very undesirable. Moreover, the loss of oil to the formation is very expensive, not only because of the cost of the oil itself, but also due to the cost of maintaining the properties and composition of the fluid.

Various additives have been used or suggested for use as fluid loss additives to prevent or decrease this loss of fluid by filtration from oil base muds. Some of the first materials used for this purpose were asphalt and various modified asphaltic materials. The following U.S. patents all disclose various amine derivatives of various polyphenolic compounds for use as fluid loss additives (hereinafter sometimes referred to as FLA) for oil base muds: Jordan et al. U.S. Pat. No. 3,168,475; Jordan et al. U.S. Pat. No. 3,281,458; Beasley et al. U.S. Pat. No. 3,379,650; Cowan et al. U.S. Pat. No. 3,232,870; Cowan et al. 3,425,953; Andrews et al. U.S. Pat. No. 3,494,865; Andrews et al. U.S. Pat. No. 3,671,427; Andrews et al. U.S. Pat. No. 3,775,447; Kim U.S. Pat. No. 3,538,071; and Kim U.S. Pat. No. 3,671,428. These patents are incorporated herein by reference for all purposes.

Jordan et al. U.S. Pat. No. 3,168,475 discloses certain substituted ammonium salts of humic acid. As stated therein at column 6, lines 41-51: "We have found that the reaction of the organic bases with humic acid results in the formation of a normal salt, with the stoichiometrically equivalent quantities of the components entering thereinto. This is not to imply that only exactly stoichiometrically equivalent quantities may be used in practicing our invention. For example, if an excess of the base is used, then in addition to the alkyl ammonium humate which forms, some unreacted excess base will be present intermixed therewith; while if an excess of humic acid is used, the latter will be present as a diluent of the alkyl ammonium humate produced."

Jordan et al. U.S. Pat. No. 3,281,458 discloses certain substituted ammonium salts of humic acid in which the ammonium cation is selected from the group consisting of a mono-long-chain, primary amine; a di-long-chain secondary amine; a di-long chain, mono-short-alkyl tertiary amine; a tri-long-chain tertiary amine; a di-long chain, di-short-alkyl quaternary amine; and a tetra-long-chain quaternary amine; wherein the term "long-chain" is an alkyl group having from 12 to 22 inclusive carbon atoms, and wherein the term "short-alkyl" is any of the radicals: methyl, ethyl, propyl. The patent specifically states that outside of the scope of the invention are substituted ammonium humates comprising, among others, secondary, tertiary and quaternary amines possessing only one long chain, and ring compounds such as substituted pyridinium and substituted imidazolinium compounds.

Beasley et al. U.S. Pat. No. 3,379,650 discloses various additives (dispersants) which facilitate the dispersion of long chain alkyl ammonium humates in organic liquids. Such humates are more readily dispersible in some organic liquids than in others. The dispersibility of these humates is also dependent to some extent on their processing during manufacture. Thus drying these long chain alkyl ammonium humates decreases their dispersibility.

Cowan et al. U.S. Pat. No. 3,232,870 discloses certain alkyl ammonium lignosulfonates. Cowan et al. U.S. Pat. No. 3,425,953 discusses problems of dispersing the alkyl ammonium lignosulfonates in certain organic liquids and discloses dispersants to increase their dispersibility.

Andrews et al. U.S. Pat. No. 3,494,865 discloses an adduct prepared by reacting humic acid with from about 50% to about 110% of its base-combining capacity, with certain fatty acid partial amides of a polyalkylene polyamine. As stated therein at column 3, lines 10-12: "The adduct as described and wherein the partial amide is present to the extent of about 110% of the base-combining capacity of the humic acid probably represents salt formation for 100%, the remaining 10% being adsorption, although in view of the complicated nature of the constituents, exact structural analysis is difficult and somewhat uncertain. Also, depending on the drying temperature, where heat is used for such a step, the adduct may undergo a certain extent of amidification where the amine groups of the polyamines are combined with the carboxyl groups of the humic acid." Andrews et al. discuss the dispersion of such adducts in well working fluids and further discloses certain dispersants which are desirable to expedite the dispersion of the adducts without depending on down-hole circulation of the well working fluids.

Andrews et al. U.S. Pat. No. 3,671,427 discloses certain adducts of humic acid and a fatty acyl partial amide of a polyalkylene polyamine wherein the partial amide is linked to the humic acid by an amide linkage.

Kim U.S. Pat. Nos. 3,538,071 and 3,671,428 disclose a water-in-oil emulsifier prepared by reacting an oxidized lignin product (oxidized lignosulfonates) with certain primary or secondary amines, and heating at a temperature in the range of 120° C. to the thermal decomposition temperature of the resulting product. The heating is said to increase the solubility of the product in diesel oil and is undertaken such that a dehydrating reaction occurs. The ratio of amine to lignin represents an amount of the amine in the range from 70% to 100% of the lignin; however, it may be as little as 35% or up to 150% or more.

As noted by the examples in the aforementioned patents, the amount of the organic ammonium compound reacted with the polymeric phenolic compounds disclosed is quite high, of the order of 75%–100% or more, based on the weight of the polymeric phenolic compound. Moreover, these FLA all possess poor dispersibility in well working fluids unless elaborate procedures are undertaken, such as the addition of a dispersant, heating, agitating under high shear or for extended time periods, drying under low temperature conditions, flushing, and the like.

Accordingly, then is a need for a FLA for use in oil base well working fluids which disperses easily in the well working fluid. It is one object of this invention to provide such a FLA.

It is another object of this invention to provide organophilic derivatives of polyphenolic compounds which disperse easily in well working fluids.

It is still another object of this invention to provide a method of preparing FLA comprising certain organophilic derivatives of polyphenolic compounds which disperse easily in well working compositions.

A further object of this invention is to provide well working compositions containing a novel FLA as disclosed hereinafter.

The novel FLA of my invention comprises an organophilic derivative of a polyphenolic compound which contains certain ammonium compounds and a polyvalent metallic cation associated therewith.

The polyphenolic compounds useful in the practice of this invention include: humic acid; lignosulfonic acid; modified polyphenolic condensates; modified tannins; the oxidized, sulfonated, and sulfomethylated derivatives of these polyphenolic compounds; and the water soluble salts of these polyphenolic compounds or these derivatives. The following U.S. patents incorporated herein by reference, all disclose various polyphenolic compounds which can be used to practice this invention: U.S. Pat. Nos. 2,831,022—sulfonated tannins; 3,232,870—lignosulfonates; 3,391,173—sulfomethylated tannins; 3,639,263—HCN modified lignosulfonates; 3,671,428—oxidized lignosulfonates; 3,700,728—sulfonated humic acids, lignite and oxidized coals; 3,726,850—ozone oxidized lignins; 3,956,140—sulfonated lignite, sulfonated phenolic condensates, and sulfomethylated phenolic condensates; 4,069,034—humic acids; 4,088,640—ozone oxidized lignosulfonates; and 4,196,777—oxidized lignosulfonates.

The preferred polyphenolic compound is humic acid. Humic acid is a material of wide distribution and is present in soils, peat, and coals, particularly lignite or brown coal, and most particularly in the soft brown coal known as a leonardite. Humic acids are complex organic molecules that are formed by the breakdown of organic matter. Their exact structures are unknown, and they are extremely variable. The principal organic groups present are phenolic and carboxylic OH, aliphatic CH, carbonyl, conjugated carbonyl or aromatic $CH_2$ or $CH_3$ or ionic carboxyl, and possibly others. The average molecular weight of the humic acids is between 5,000 and 50,000. They have no x-ray or electron diffraction patterns and are therefore presumably amorphous.

The humic acids have a large cation exchange capacity which varies from 200 to 500 milliequivalents per 100 grams at pH7 depending on the humus source. Humic acids are colloids. When the cation exchange sites on the humic molecule are filled predominantly with other than hydrogen, the material is called humate. The humates of monovalent inorganic and ammonium ions are soluble in water, but the humates of multivalent cations are insoluble.

The term humic acid is used herein to include all of the colloidal acids derived from humus, including humic acid, ulmic acid and fulvic acid. Humic acid is soluble in alkali but insoluble in acid, methyl ethyl ketone, and methyl alcohol. Ulmic acid is soluble in alkali and methyl ethyl ketone but insoluble in methyl alcohol. Fulvic acid is soluble in alkali, methyl ethyl ketone and methyl alcohol. The term humic acid is also intended to mean humic acids which have been further oxidized to increase their carboxyl content. See for example, "Chemistry of Brown Coals. IV. Action of Oxygen in Presence of Alkali," R. A. Durie and S. Sternhill, Australian Journal of Applied Science, 9, No. 4, 360–369, 1958.

While humic acid is present in soils and peat, and may be extracted from them, for example, with dilute aqueous alkali, it is preferred to obtain humic acid for the purposes of this invention in the form of lignite of high alkali solubility, of which vast deposits are found throughout the world, including particularly, the United States, for example, in North Dakota, Montana, Texas, New Mexico, and California. While I do not mean to be limited thereby, I prefer a humic acid source having a solubility in dilute, aqueous sodium hydroxide of at least 75% by dry weight, as this provides a reasonable compromise between cost and efficacy in the final product.

The amino compounds which may be used in this invention are polyamines or polyamidoamines which contain at least two primary, secondary or tertiary amine groups per molecule selected from the group consisting of $$R-NR'-(C_xH_{2x}NR')_yH \quad\quad (I)$$
$$R''-CO-NH-(C_xH_{2x}NR')_2H \quad\quad (II)$$

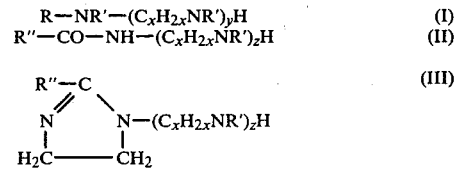
(III)

where $2 \leq X \leq 3$; $y \geq 1$; $z \geq 2$; R is an aliphatic group containing from 12 to 30 carbon atoms; R' is selected from the group consisting of H and R''—CO, and mixtures thereof; R'' is an aliphatic group containing from 11 to 29 carbon atoms; and wherein at least two of the R' groups are H.

Preferably x=3 in the compounds represented by formula I and x=2 in the compounds represented by formulas II and III. Preferably $1 \leq y \leq 7$, $2 \leq z \leq 8$, R is an alkyl group containing from 12 to 22 carbon atoms, and R'' is an alkyl group containing from 11 to 21 carbon atoms. Most preferably at least 65% of the aliphatic radicals represented by R contain 18 carbon atoms, and at least 65% of the aliphatic groups represented by R'' contain 17 carbon atoms. Still more preferably the R'' group is derived from tall oil fatty acid.

In the foregoing as well as elsewhere in this specification and the claims which follow, the term aliphatic is to be understood as including unsaturated as well as saturated (alkyl) straight carbon chain radicals, and straight carbon chain radicals which contain one or more hydroxyl or amino groups substituted therein.

By way of further explanation of the nature and types of the amino compounds utilized in the present invention are some typical members of the series in the following table, although these are merely illustrative and not at all by way of limitation.

---

Group I

R—NH—$C_3H_6$$NH_2$
R—NH—$C_3H_6$—NH—$C_3H_6$—$NH_2$
R—NH—$C_3H_6$—NH—$C_3H_6$—NH—CO—R''
R—NH—$C_2H_4$—NH—$C_2H_4$—$NH_2$
R—NH—$C_2H_4$—NH—$C_2H_4$—NH—CO—R''
R—NH—$C_2H_4$—NH—$C_2H_4$—N(COR'')—$C_2H_4$—NH—CO—R''
R—NH—$C_3H_6$—N(CO—R'')—$C_3H_6$—NH—$C_3H_6$—NH—CO—R''

Group II

R''—CO—NH—$C_2H_4$—NH—$C_2H_4$—$NH_2$
R''—CO—NH—$C_2H_4$—NH—$C_2H_4$—NH—$C_2H_4$—NH—CO—R''
R''—CO—NH—$C_2H_4$—NH—[$C_2H_4$—N(CO—R'')]$_2$—$C_2H_4$—$NH_2$
R''—CO—NH—($C_2H_4$—NH)$_2$—[$C_2H_4$—N(CO—R''$^2$)]$_2$H
R''—CO—NH—($C_2H_4$—NH)$_3$—[$C_2H_4$—N(CO—R'')]$_2$H
R''—CO—NH—($C_2H_4$—NH)$_2$—[$C_2H_4$—N(CO—R'')]$_3$H
R''—CO—NH—($C_2H_4$—NH)$_2$—[$C_2H_4$—N(CO—R'')]$_4$H
R''—CO—NH—($C_2H_4$—NH)$_2$—[$C_2H_4$—N(CO—R'')]$_5$H
R''—CO—NH—($C_2H_4$—NH)$_2$—[$C_2H_4$—N(CO—R'')]$_6$H
R''—CO—NH—($C_2H_4$—NH)$_3$—[$C_2H_4$—N(CO—R'')]$_6$H
R''—CO—NH—($C_2H_4$—NH)$_3$—[$C_2H_4$—N(CO—R'')]$_5$H

Group III

R'''—($C_2H_4$—NH)$_2$H
R'''—($C_2H_4$—NH)$_2$—$C_2H_4$—NH—CO—R''
R'''—$C_2H_4$—NH—$C_2H_4$—N(CO—R'')—$C_2H_4$—$NH_2$
R'''—($C_2H_4$—NH)$_3$—$C_2H_4$—NH—CO—R''
R'''—($C_2H_4$—NH)$_2$—[$C_2H_4$—N(CO—R'')]$_2$H
R'''—($C_2H_4$—NH)$_2$—[$C_2H_4$—N(CO—R'')]$_5$H where R''' is the imidazoline group $$R''-C\begin{array}{c}\diagup\diagdown\\N\quad N-\\|\quad\quad|\\H_2C-\!-\!-CH_2\end{array}$$

---

The preferred amino compounds for use in this invention are the fatty acyl partial amides, which may also be called fatty acid amido amines, from Group II which result from the reaction of fatty acids with polyalkylene polyamines. The preferred fatty acids contain from 12 to 22 carbon atoms, preferrably from 14 to 18 carbon atoms. The preferred polyalkylene polyamines are polyethylene polyamines having from 3 to about 9 amino groups, and thus includes tri-amines such as diethylene triamine, tetra-amines such as triethylene tetramine, pentamines such as tetraethylene pentamine, and higher analogs of these, up to nine and more amino groups. The amide is only partial, that is, it is such that from about one-fourth to about three-fourths of the nitrogen atoms are present in the form of a fatty acid amide, the balance being in the form of free amino groups.

Most preferably the polyethylene polyamine contains from 6 to 9 amino groups and the fatty acid is selected from the group consisting of tall oil fatty acid, hydrogenated tallow fatty acid, and mixtures thereof. The preferred fatty acyl partial amides of Group II have an average equivalent weight in the range from about 650 to about 850.

The fluid loss additives of my invention comprise complex organophilic derivatives of one or more of the polyphenolic compounds, one or more of the amino compounds, and one or more polyvalent metallic cations.

The polyvalent metallic cations may be any of such cations which form a water soluble salt with a monovalent anion. Preferred polyvalent metallic cations are those cations whose hydroxides are sufficiently soluble in water to react with the polyphenolic compound. The most preferred cation is calcium because of its availability and cost.

Non-limiting illustrative examples of polyvalent metallic cations which can be utilized are calcium, magnesium, iron, zinc, nickel, chromium, aluminum, and the like.

The polyvalent metallic cation functions to increase the solubility of the ammonium polyphenolic acid salt in organic systems, particularly petroleum oils of the type used in well-working fluids, and also functions to stabilize the ammonium polyphenolic acid salt against further reaction to form an amide linkage and water. Thus if the ammonium polyphenolic acid salt, without the polyvalent metallic cation salt present, is ground and bagged excessive heating will occur in palletized bags and the material can get hot enough to burn. Excessive by-product water is produced and the material becomes extremely wet. Furthermore, as the degree of conversion of the ammonium polyphenolic acid salt groups to amide groups increases, the solubility of the material in oil decreases.

It has been found that the addition of the polyvalent metallic cation compound to the ammonium polyphenolic acid salt complex prevents any significant conversion of the ammonium salt groups to amide groups, thus stabilizing the material and preserving the oil solubility of the material.

Generally speaking, the FLA may be produced by bringing together the polyphenolic compound in acid form and the amino compound in its base form. The base and acid neutralize each other as they react with salt formation. In this step there must be present at least about 35% water, based on the weight of the polyphenolic compound, preferably at least about 40% water, in order to insure that the acid and base can react. Generally intensive mixing is sufficient for reaction. The temperature and time of reaction is not critical and need only be sufficient to insure that the polyphenolic acid and the amino compound react to form an ammonium salt of the polyphenolic acid. The reaction is exothermic and the reaction itself raises the temperature of the reactants. Generally the polyphenolic acid may be ambient temperature and the amino compound at a temperature sufficient to provide the amino compound in a liquid state, either melted or in solution or dispersion in a suitable solvent such as water, methanol, isopropanol, and the like.

This method can be employed in any conventional high intensity mixer which is capable of handling solid or semi-solid materials, such as a pug mill, ribbon blender, Littleford Bros. Mixer, Martin Mixer and the like apparatus.

Thereafter there is added to the ammonium polyphenolic acid complex a polyvalent metallic cation compound which is sufficiently soluble in water to react with the ammonium polyphenolic acid complex to form a salt therewith.

Non-limiting illustrative examples of suitable polyvalent metallic cation compounds include calcium oxide, calcium hydroxide, calcium chloride, calcium acetate, calcium bromide, magnesium chloride, magnesium hydroxide, magnesium sulfate, ferric chloride, ferrous sulfate, zinc chloride, zinc sulfate, nickelic chloride, chromic chloride, aluminum chloride, aluminum sulfate, and the like. The preferred polyvalent metallic cation compound is selected from the group consisting of calcium oxide, calcium hydroxide, calcium chloride, and mixtures thereof, most preferably either lime or quick lime.

This method of preparing the FLA of my invention is particularly suitable when the polyphenolic acid is insoluble in water and the amino compound is sufficiently soluble to react with the polyphenolic acid. Depending on the amount of water added, the ammonium polyphenolic acid complex may be in a semi-solid state. Water contents less than about 60% by weight of the ammonium polyphenolic complex will generally produce a semi-solid complex. Mixing of the polyvalent metallic cation compound into this semi-solid complex will produce a viscous paste which is very hard to handle if the mixing is continued for an excessive period. Generally mixing for 10 minutes is sufficient to obtain the benefits of the polyphenolic metallic cation compound and still obtain a semi-solid complex which is easily handled in the intensive mixer. It is to be understood, however, that if the preparation of the FLA is undertaken in apparatus which can handle both semi-solid materials and viscous pastes, then there is no limit to be placed on the time for mixing the FLA.

Thereafter the FLA is dried to less than about 25% by weight moisture, preferably from about 5% to about 20% water, and ground to produce a free-flowing powder. The particle size of the powder will preferably be such that at least 95% by weight will pass through a 100 mesh screen. The drying temperature may be relatively low, such as 100°–120° C., for example, or it may be at a higher temperature, such as, for example, about 300° C. In general, it is preferred to dry at from 200° C. to 400° C.

In a preferred embodiment of my invention, there is added to the FLA before drying and grinding an inert solid diluent in an amount sufficient to improve the handling characteristics of the FLA. This diluent may be added either before or after the polyvalent metallic cation compound is added to the ammonium polyphenolic acid complex. It is most preferred that this diluent be added after the polyvalent metallic compound and before the FLA is mixed to the extent that a paste is formed.

Suitable diluents which may be used, for example, and not by way of limitation, are kaolin, diatomaceous earth, silica, calcium carbonate, ground vegetable by-products such as bagasse, and the like. The preferred diluent is a hydrophobic, organophilic, water wettable fibrous material as disclosed in co-pending application Ser. No. 269,493 filed June 1, 1981 entitled: Well Working Compositions, Method of Decreasing The Seepage Loss From Such Compositions, and Additive Therefor, which is assigned to the same assignee of the present invention, the disclosure of which is incorporated herein by reference. This hydrophobic, organophilic water wettable fibrous material not only improves the handling of the product but also improves the performance of the FLA in well-working compositions.

The amount of the amino compound reacted with the polyphenolic acid compound will be from about 20% to about 50% by weight based on the weight of moisture-free polyphenolic acid, preferably from about 25% to about 45%. Larger amounts of the amino compound could be used, such as amounts up to about 100% to 150% or more, but in general this amount is excessive and not necessary due to the presence of the polyvalent metallic cation in the FLA.

The amount of the polyvalent metallic cation compound reacted with the ammonium polyphenolic acid complex will be a percentage by weight of moisture-free ammonium polyphenolic acid complex in the range from about $(EW) \div 18$ to about $(EW) \div 4$ where EW is the equivalent weight of the anhydrous polyvalent metallic cation compound.

The amount of the solid diluent added to the FLA will generally range up to about 35% by weight of the moisture-free FLA, preferably in the range from about 15% to about 30% by weight.

Other methods employing larger amounts of water in the reaction can be used if the polyphenolic acid is water soluble or the polyphenolic acid is converted to its simple salt form with a solubilizing base such as an alkali metal or ammonium hydroxide, preferably sodium hydroxide. This method is advantageously employed where the amino compound is in a salt form, as for example, the hydrochloride, acetate, phosphate, and the like. In this process, the FLA should be filtered or otherwise mechanically treated to remove water before the FLA is dried and ground. This method is particularly advantageous where larger quantities of amino compound are desired in the FLA, such as amounts greater than about 50% by weight, based on the weight of the moisture-free polyphenolic acid or water soluble salt thereof.

This method can also be employed in the process previously described which utilizes low concentrations of water where the alkali necessary to convert the polyphenolic acid to its simple salt form, such as sodium, may be included in the intensive mixer with the polyphenolic acid before addition of the amino salt thereto.

The reaction of the polyphenolic compound and the amino compound produces an organophilic amino polyphenolic acid complex which is readily soluble or dispersible in liquid organic mediums and particularly in those organic liquids used in well-working fluids, such as diesel oil. However, I have found that if the reaction is allowed to proceed to the extent that appreciable amide groups are formed by the elimination of water from the ammonium polyphenolic acid complex, then the complex is insoluble and very poorly dispersible, if at all, in those organic liquids used in well-working fluids, and will not provide any fluid loss control therein. Moreover, if the reaction is incomplete and the amino polyphenolic acid complex is ground and bagged, excessive heating will occur due to the continued reaction between the amino compound and the polyphenolic acid compound, and the complex can get hot enough to burn. Also, excessive by-product water is produced and the material becomes extremely wet.

The addition of the polyvalent metallic cation compound to the ammonium polyphenolic acid complex results in an organophilic ammonium, metallic cation polyphenolic acid complex which is soluble or easily dispersible in well-working fluid compositions to reduce the fluid loss thereof. Moreover, this FLA is stabilized and the continued reaction between the amino compound and the polyphenolic acid compound no longer takes place.

The FLA may be used as produced, but preferably after drying and grinding as disclosed hereinbefore, for inclusion in well-working fluids. The FLA are easily solubilized or dispersed in oil base well-working fluids with the normal agitation available where such fluids are prepared, such as at liquid "mud" plants or at the location where the well-working fluid will be used.

The oil which forms a continuous phase of the well-working fluid is a petroleum oil, and most generally is an ordinary diesel oil, although it may be rather lighter, such as kerosene, or somewhat heavier, such as fuel oil, white oils, or crude oil. In some cases the sole constituents of the well-working fluids may be simply a petroleum oil and the FLA. The latter may be present from as little as 2 pounds per 42 gallon barrel (2 ppb.) to as high as 50 ppb. The beneficial effect on fluid loss of the use of the FLA may be observed even at the lowest concentration. This is especially the case when the FLA is added to the well-working fluids containing other additives, of types to be mentioned hereinbelow.

Frequently, the well-working fluids will contain other additives, a common one being water, often present from as little as 2% or 3% by volume to as great as 40% to 60% by volume. It is desirable and common to use a suitable emulsifying agent, which may be the calcium salt of an inexpensive fatty acid, e.g., calcium tallate, to emulsify the water in the oil. An important feature of my invention, however, is that the FLA are excellent emulsifying agents for any water which may be present in the well-working fluids. It is important that such water be kept in the form of a good stable water-in-oil emulsion.

The presence of water in the well-working fluids serves to increase the density of the fluid somewhat since the water is heavier than the oil used; and it also helps to reduce filtration. Also it lowers the cost of the well-working fluid which is often an important item when large volumes are used. Often water soluble salts such as calcium chloride are added to the aqueous phase.

Weighting materials are routinely used in well-working fluids where needed, such as ground barite, calcium carbonate, siderite, iron oxide, ilmenite and the like. Suspending agents and viscosifiers such as organophilic clays, asphalt and the like are commonly employed. Moreover, the well-working fluids may contain various oil soluble or dispersible materials which function to keep the solids in the well-working fluid from being wet with water.

Dispersants for organophilic polyphenolic compounds such as those disclosed in Beasley et al. U.S. Pat. No. 3,379,650 and Cowan et al. U.S. Pat. No. 3,425,953 may be added to the well-working fluids but generally they are of no benefit as dispersants since the FLA of my invention are readily soluble or dispersible in well-working fluids.

Addition of one or more of the amino compounds utilized in preparing the FLA of this invention to the well-working fluid may advantageously increase the thermal stability and emulsion stability of the well-working fluid.

The following non-limiting examples illustrate the results and benefits obtainable utilizing the FLA of this invention in well-working fluids as well as illustrating the preferred method of preparing the FLA. In the examples, all percentages are by weight unless otherwise indicated.

EXAMPLE 1

657 grams of tall oil fatty acid were mixed with 137 grams of a commercial polyamine and the mixture heated to 400° F. for 1.5 hours. This polyamide was a "bottoms" product from the commercial production of tetraethylene pentamine and contained polyethyleneamines having greater than 5 amino groups per molecule. The equivalent weight of the resulting fatty acyl partial amide was determined to be 747 gm./equiv.

182 grams of minus 200 mesh naturally oxidized North Dakota lignite (leonardite, having an alkali solubility of 75% by weight) containing 45% water was intensively mixed in a Waring Blender with 30 grams of this polyamino compound for 5 minutes. Thereafter there were added to the hot ammonium lignite salt 3.3 grams of $Ca(OH)_2$ and the mixing continued for 5 minutes. The product was removed, dried at 150° F. to a moisture content of 18%, and ground such that 90% passed through a 100 mesh (U.S.) screen.

EXAMPLE 2

695 grams of tallow fatty acid were mixed with 144 grams of a commercial polyamine and the mixture heated to 400° F. for 2 hours. As in Example 1, this polyamine was a "bottoms" product from the commercial production of tetraethylene pentamine and lower polyethylene amines, and contained polyethylene amines having greater than 5 amino groups per molecule. The equivalent weight of the resulting fatty acyl partial amide was determined to be 690.

167 grams of minus 200 mesh leonardite having an alkali solubility of 80% by weight containing 40% water was intensively mixed with 25 grams of this polyamine compound for 5 minutes. Thereafter there was added to the hot ammonium lignite salt 10.0 grams of $Ca(OH)_2$ and the mixing continued for 2.5 minutes. The product was removed, dried at 180° F. to a moisture content of 20%, and ground such that 92% passed through a 100 mesh screen.

EXAMPLE 3

861 grams of Acintol FA-1 tall oil fatty acid were mixed with 164.5 grams of a commercial polyamine and the mixture heated to 400° F. for 1 hour. This polyamine was also a "bottoms" product obtained from the commercial production of polyethylene amines. The polyamine contained greater than 5 amino groups per molecule. The equivalent weight of this fatty acyl partial amide was determined to 828.

222 grams of the leonardite of Example 2 with the moisture content adjusted to 55% by weight was intensively mixed with 35 grams of this polyamino compound for 10 minutes. Thereafter there were added to the hot ammonium lignite salt 5.0 grams of $Ca(OH)_2$ and the mixing continued for 3.5 minutes. The product was removed, dried at 160° F. to a moisture content of 15% by weight, and ground.

EXAMPLE 4

Example 3 was repeated except that 45 grams of the polyamino compound and 10 grams of $Ca(OH)_2$ were reacted. After addition of the lime the mixing was continued for 2 minutes. Thereafter there were added 28 grams of hydrophobic organophilic water wettable fibrous cotton, as disclosed in co-pending patent application Ser. No. 269,493 filed June 1, 1981 entitled: Well Working Compositions, Method of Decreasing the Seepage Loss From Such Compositions, and Additive Therefor, which is assigned to the same assignee of the present invention, the disclosure of which is incorporated herein by reference. After mixing an additional 3 minutes the product was removed, dried at 150° F. to a moisture content of 16%, and ground.

EXAMPLE 5

100 grams of a commercial sodium lignosulfonate, dry basis, was dispersed in 1.5 liters of water and heated to 150° F. 30 grams of a commercial fatty acyl partial amide having an equivalent weight of 735 grams/equivalent were mixed with 1.5 liters of water heated to 175° F. and hydrochloric acid was added to decrease the pH to 3. The aqueous polyamine compound dispersion was added to the lignosulfonate dispersion while mixing. Thereafter 13 grams of FeCl$_3$ were added and the mixing continued for 2 minutes. 33 grams of the hydrophobic organophilic water wettable fibrous material of Example 4 were then added and the mixing continued for 5 minutes. The flocculated lignosulfonate was filtered, dried at 150° F., and ground such that 90% passed through a 100 mesh screen.

Comparative Examples 1–5

Examples 1–4 were repeated except that no lime was added to the ammonium lignite salt complexes, and Example 5 was repeated except that no ferric chloride was added to the ammonium lignosulfonate salt complex.

EXAMPLE 6

The FLA of Examples 1–5 and the comparative polyphenolic acid salt complexes were evaluated by mixing 10 grams of each material in 350 ml. of diesel oil for 5 minutes on a Multimixer. Thereafter those fluids were tested for fluid loss according to the API RP 13B procedure. The results are given in Table 1.

The results indicate the good fluid loss characteristics of oil base well working fluids containing the FLA of this invention. The ammonium polyphenolic acid salt complexes without the polyvalent metallic compound were insoluble in oil and did not decrease the fluid loss.

EXAMPLE 7

The FLA of Examples 1–5 and the comparative ammonium polyphenolic acid salt complexes were evaluated at a concentration of 5 lb./bbl. in an oil base invert emulsion mud having a 70/30 oil/water ratio containing 15 lb./bbl. of calcium tallate emulsifier, 2 lb./bbl. of an organophilic attapulgite suspending agent and 500 lb./bbl of barite weighing agent. The drilling fluids were mixed for 15 minutes on a Multimixer before determining the API RP 13B fluid loss. The data obtained are given in Table 2.

The data indicate that the FLA of this invention were effective in decreasing the fluid loss of this mud whereas the corresponding materials without the polyvalent metallic compound were very poor fluid loss additives.

TABLE 1

| FLA | API Fluid Loss, ml. |
|---|---|
| Example 1 | 1.6 |
| Example 2 | 2.3 |
| Example 3 | 3.6 |
| Example 4 | 1.2 |
| Example 5 | 7.0 |
| Comparative Example 1 | No Control |
| Comparative Example 2 | No Control |
| Comparative Example 3 | No Control |
| Comparative Example 4 | No Control |
| Comparative Example 5 | No Control |

TABLE 2

| FLA | API Fluid Loss, ml. |
|---|---|
| Example 1 | 0.5 |
| Example 2 | 1.3 |
| Example 3 | 0.8 |
| Example 4 | 0.5 |
| Example 5 | 2.3 |
| Comparative Example 1 | 16.5 |
| Comparative Example 2 | 18.4 |
| Comparative Example 3 | 21.7 |
| Comparative Example 4 | 14.2 |
| Comparative Example 5 | 12.3 |
| None | 20.6 |

I claim:

1. An organophilic derivative of a polyphenolic compound comprising a complex salt of a polyphenolic acid, an amino compound, and a polyvalent metallic cation formed by reacting a salt of said polyphenolic acid and said amino compound with a polyvalent metal compound; wherein said polyphenolic acid is selected from the group consisting of humic acid, sulfonated humic acids, and mixtures thereof; wherein said amino compound has the structural formula:

$$R''-CO-NH-(C_xH_{2x}NR')_zH$$

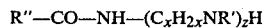

where $2 \leq x \leq 3$; $z \geq 2$; R' is selected from the group consisting of H and R''—CO, and mixtures thereof; R'' is an aliphatic group containing from 11 to 29 carbon atoms; wherein at least two of the R' groups are H; wherein said polyvalent metallic cation is selected from the group consisting of calcium, magnesium, iron, zinc, nickel, chromium, aluminum, and mixtures thereof; wherein the amount of said amino compound is from about 20% to about 50% by weight based on the weight of moisture free polyphenolic acid; and wherein the amount of said polyvalent metallic cation compound is such that the percentage by weight, based on the weight of the moisture-free polyphenolic acid salt, is in the range from about (EW)÷18 to about (EW)÷4 where (EW) is the equivalent weight of the anhydrous polyvalent metallic cation compound.

2. The composition of matter of claim 1 wherein x is two, $2 \leq z \leq 8$, and R'' is an aliphatic group containing from 11 to 21 carbon atoms.

3. The composition of matter of claim 2 wherein said R'' group is an aliphatic group containing from 13 to 17 carbon atoms.

4. The composition of matter of claim 1 wherein said amino compound is a fatty acyl partial amide obtained by reacting a polyethylene polyamine containing from 3 to about 9 amino groups with a fatty acid containing from 14 to 18 carbon atoms is an amount such that from about one-fourth to about three-fourths of the nitrogen atoms are present in the form of a fatty acid amide, provided that at least two of said nitrogen atoms are present as unreacted amino groups.

5. The composition of matter of claim 4 wherein said humic acid is present in the form of lignite having a solubility in aqueous sodium hydroxide of at least 75% by dry weight, and wherein said polyvalent metallic cation is calcium.

6. The composition of matter of claim 1, 2, 3, or 4 wherein said polyphenolic acid is humic acid.

7. The composition of matter of claim 1, 2, 3, or 4 wherein said humic acid is present in the form of lignite having a solubility in aqueous sodium hydroxide of at least 75% by dry weight.

8. The composition of matter of claim 1, 2, 3, or 4 wherein said humic acid is present in the form of lignite having a solubility in aqueous sodium hydroxide of at least 75% by dry weight, and wherein said polyvalent metallic cation is calcium.

9. The composition of matter of claim 1, 2, 3, 4, or 5 in which there is present an inert solid diluent in an amount sufficient to improve the handling characteristics of said composition.

10. The composition of matter of claim 1, 2, 3, 4, or 5 in which there is present a hydrophobic organophilic water wettable fibrous material in an amount sufficient to improve the handling characteristics of said composition.

11. An oil base well-working fluid comprising a major proportion of oil and a minor proportion but sufficient to substantially decrease the filter loss of said fluid of the composition of matter of claim 1, 2, 3, 4, or 5.

12. In a method of preparing an organophilic derivative of a polyphenolic acid wherein said polyphenolic acid is mixed intensively with an amino compound in an amount of from about 20% to about 50% by weight based on the weight of the moisture free polyphenolic acid to form an ammonium salt of said polyphenolic acid, the improvement which comprises mixing with said ammonium polyphenolic acid salt to form a complex salt therewith a polyvalent metallic cation compound in an amount such that the percentage by weight, based on the weight of the moisture-free ammonium polyphenolic acid salt, is in the range from about $(EW) \div 18$ to about $(EW) \div 4$ where EW is the equivalent weight of the anhydrous polyvalent metallic cation compound; wherein said polyphenolic acid is selected from the group consisting of humic acid, sulfonated humic acid, and mixtures thereof; wherein said amino compound has the structural formula:

$$R'' - CO - NH - (C_xH_{2x}NR')_zH$$

and mixtures thereof, where $2 \leq x \leq 3$; $z \geq 2$; $R'$ is selected from the group consisting of H and $R'' - CO$, and mixtures thereof; $R''$ is an aliphatic group containing from 11 to 29 carbon atoms; wherein at least two of the $R'$ groups are H; and wherein said polyvalent metallic cation is selected from the group consisting of calcium, magnesium, iron, zinc, nickel, chromium, aluminum, and mixtures thereof.

13. The method of claim 12 wherein said polyvalent metallic cation is calcium.

14. The method of claim 12 wherein said polyvalent metallic cation compound is selected from the group consisting of calcium hydroxide, calcium oxide, and mixtures thereof.

* * * * *